Patented Dec. 2, 1952

2,620,264

UNITED STATES PATENT OFFICE 2,620,264

METHOD OF MAKING SILVER IODIDE CRYSTALS

Robert A. Watson, Webster Groves, Mo., assignor to Missouri Automatic Control Corporation, St. Louis, Mo., a corporation of Missouri No Drawing. Application September 14, 1951, Serial No. 246,720

6 Claims. (Cl. 23—305)

The present invention relates to a method of making silver iodide crystals. Heretofore, silver iodide crystals have been made in laboratories, but it has not been practicable commercially to make silver iodide crystals having the size and uniformity desirable for many uses, the laboratory method being exceedingly slow. Silver iodide as presently produced commercially is substantially a flocculent mass rather than crystals.

Consequently, the object of the present invention is to provide a process for producing silver iodide crystals, which process produces crystals rapidly as compared with the laboratory process and which also produces crystals which are well above colloidal size and of relatively uniform size.

One of the uses of silver iodide which makes it important that the compound be in crystalline form of hexagonal lattice structure and of fairly even size crystals is for seed crystals in water-filled thermostatic elements that are designed to operate when a water charge in the thermostatic element expands upon freezing. The presence of the silver iodide crystals in such water-charged thermal elements prevents super-cooling of the water and causes the thermal element to operate at the exact freezing point of water which it otherwise would not ordinarily do.

Heretofore, it has been impossible to obtain silver iodide crystals commercially which were not a part of a flocculent mass and which, as such, were unsatisfactory because it was impossible to separate out only those particles of properly sized hexagonal lattice structure.

In the preferred performance of the process, silver iodide in the flocculent state as obtained commercially is dissolved in 47% hydriodic acid and 190 proof commercial alcohol is added. In the preferred ratios, the solution is in the proportions of 4 oz. of silver iodide to 110 ml. of hydriodic acid, and the volume of this solution is preferably doubled by the addition of alcohol. Conveniently, this liquor may be placed in a glass container.

Again in the preferred method of performing the process, an immersion heater is inserted into the liquor and the liquor is heated to a temperature of approximately 180° F., at which temperature bubbling takes place. Heating is continued until substantially all of the alcohol is evaporated at a temperature of approximately 205° F. The process is terminated when the temperature reaches 205° F., because any appreciable increase in the temperature above this point will result in a re-solution of the crystals. During the bubbling period, crystals will form out of the liquor at a relatively rapid rate, which crystals are of a size which is satisfactory for many purposes as, for example, to provide seed crystals in water-filled thermal elements.

When the liquor has reached 205° F., it is allowed to cool, after which the liquor is poured off from the crystals. The liquor may be reprocessed by again doubling its volume with alcohol and adding sufficient hydriodic acid to dissolve any precipitate. Any remaining silver iodide in the liquor after processing or reprocessing may be reclaimed by adding copious quantities of water which will cause precipitation of any remaining silver iodide. The precipitate may then be recovered by any suitable means and dried, whereafter it may be again used.

The silver iodide crystals obtained by the above process may be washed several times by decantation and then flushed with alcohol and allowed to dry on filter paper. Since the material decomposes upon exposure to light, precautions should be taken as by use of brown glass containers and the prevention of exposure to strong light.

In the foregoing preferred way of carrying out the process, the silver iodide in flocculent mass constitutes a supply of the substance from which the crystals are to be derived. The hydriodic acid is a solvent for the silver iodide that can be neutralized by the addition of alcohol to produce the appropriate ester and water. Alcohol is used because it acts as a relatively slow neutralizer for the hydriodic acid. (Ethyl alcohol is preferred, but methyl alcohol can be used where its toxicity is not a problem.) The relatively slow neutralization by the alcohol permits the molecules to orient themselves so as to form crystals which descend out of solution. When the term "slow" is used, it may be defined by noting that the above described process produces silver iodide crystals of the type desired within a matter of hours (six, for example), whereas the laboratory process hereinbefore referred to required several weeks and resulted usually in unsatisfactorily large crystals.

It is preferred to use an immersion heater as a means of heating the liquor. When an immersion heater is used, the crystals drop onto the heater as they are formed out of solution. Since the bubbling agitation occurs around the heater, initially formed finer crystals appear to be thrown out again by agitation into the solution where they apparently act as seed crystals, or in any event grow, and perhaps unite with other spontaneously formed crystals until they become large enough to descend out of the solution.

This effect results in crystals of relatively uniform size. A difficulty of using heating means applied exteriorly to the bottom of the container is that the crystals descend to the bottom of the container and tend to insulate the same from the liquid contents thereof. Consequently, the bottom of the container may become highly heated, and upon a shift of the mass above it, liquid may get through to the bottom of the container, whereupon it may erupt in a violent thermal reaction.

During the bubbling phase of the process, hydrogen is evolved and alcohol is evaporated at a predetermined rate. Hence, during this phase, heat is supplied at a rate just sufficient to maintain the bubbling of the liquor so as to minimize the rate of alcohol loss by evaporation.

The proportions of silver iodide and hydriodic acid are chosen to be the practical minimum for obtaining complete solution of the silver iodide. Actually 110 ml. of 47% hydriodic acid is slightly above the actual molar quantity required for a complete solution of 4 oz. of silver iodide, and in the commercial practice of the present invention, some such overage should be allowed to assure complete solution because of the $H_2O$ content in commercial 190 proof alcohol.

The choice of an amount of alcohol sufficient to double the volume of the solution is based upon the fact that there must be enough alcohol to neutralize the quantity of acid present despite the losses incident to carrying out the process. If too little alcohol is used, then less of the available silver iodide will be brought down in crystals. Obviously, an excessive amount of alcohol would merely be wasteful. With the proportions employed, a batch containing approximately 20 oz. of silver iodide will produce a yield of approximately 80% crystals when the heating of the liquor is such that approximately six hours are required before sufficient loss of alcohol permits the temperature to rise to 205° F., at which time the heating phase of the process is terminated.

The foregoing process achieves the objective of the invention, which is to make silver iodide crystals of hexagonal lattice structure which are of a desirable size and uniformity, and to do so in a very much shorter time than heretofore has been possible.

What is claimed is:

1. A process of producing silver iodide crystals: including dissolving silver iodide in hydriodic acid and adding sufficient volume of alcohol thereto to neutralize the acid, applying heat thereto to cause the liquor to bubble, and to effect the neutralization and the separation out of crystals, while holding the heating sufficiently low to minimize the loss of alcohol, and the resolution of the crystals, the same being not substantially higher than the boiling point of the alcohol under the pressure conditions of the process.

2. A process of making silver iodide crystals: comprising dissolving silver iodide in hydriodic acid, supplying to the solution a sufficient amount of alcohol to neutralize the acid, applying heat thereto and heating the solution to a low boil; and continuing application of heat until the desired quantity of crystals is formed.

3. The process of claim 2 wherein the heating is performed by an immersion heater.

4. A process of making silver iodide crystals: comprising dissolving silver iodide in hydriodic acid in the ratio of approximately 4 oz. of silver iodide to 110 millilitres of the acid; adding alcohol in an amount approximately doubling the volume of the solution; heating the liquor at temperatures not greatly exceeding the boiling point of the alcohol, until the temperature reaches approximately 205° F., and forming silver iodide crystals out of the liquor during the heating.

5. The process of claim 4 wherein the heating is performed by an immersion heater.

6. The process of claim 5, plus the steps of separating out the crystals, and then recycling the silver iodide liquor to obtain additional crystals therefrom.

ROBERT A. WATSON.

No references cited.